US008453363B2

(12) United States Patent
Licata et al.

(10) Patent No.: US 8,453,363 B2
(45) Date of Patent: Jun. 4, 2013

(54) INTERACTIVE SYSTEMS FOR CONSUMERS AND ASSOCIATED METHODS

(75) Inventors: Gary Licata, Wood-Ridge, NJ (US); Michael Kelch, Waldwick, NJ (US)

(73) Assignee: Pur Water Purification Products, Inc., El Paso, TX (US)

( * ) Notice: Subject to any disclaimer, the term of this patent is extended or adjusted under 35 U.S.C. 154(b) by 172 days.

(21) Appl. No.: 13/083,667

(22) Filed: Apr. 11, 2011

(65) Prior Publication Data

US 2011/0266789 A1 Nov. 3, 2011

Related U.S. Application Data

(60) Provisional application No. 61/324,540, filed on Apr. 15, 2010.

(51) Int. Cl.
*G09B 25/00* (2006.01)
*G09F 19/10* (2006.01)

(52) U.S. Cl.
USPC ................ 40/406; 40/411; 434/381; 434/382

(58) Field of Classification Search
None
See application file for complete search history.

(56) References Cited

U.S. PATENT DOCUMENTS 1,502,552 A * 7/1924 Donnallan .................... 210/460
5,298,160 A * 3/1994 Ayers et al. ................... 210/232

* cited by examiner

*Primary Examiner* — Benjamin Kurtz
(74) *Attorney, Agent, or Firm* — Dinsmore & Shohl LLP

(57) ABSTRACT

A method of interacting with a component of a product at a display location is provided. The method includes moving a moveable assembly comprising a filtration device along a track component toward a stationary assembly mounted to a base. The track component guides the moveable assembly toward the adapter. The filtration device is connected to the adapter.

13 Claims, 3 Drawing Sheets

INTERACTIVE SYSTEMS FOR CONSUMERS AND ASSOCIATED METHODS

CROSS-REFERENCE TO RELATED APPLICATIONS

This application claims priority to U.S. Provisional Patent Application Ser. No. 61/324,540, filed Apr. 15, 2010, the details of which are hereby incorporated by reference in their entirety.

TECHNICAL FIELD

The present invention is generally directed to interactive systems for consumers and associated methods.

BACKGROUND

Retail displays are often used to allow consumers an opportunity to interact with a product to assist consumers in making a purchase decision between similar products. As one example, interactive systems including different video game consoles may be provided within a retail store, e.g., in an electronics department to give children and adults an opportunity to play each of the video game consoles and/or different video games when making a purchasing decision. The interactive systems may allow limited interaction with the video game consoles for security purposes. There is a desire to provide interactive systems that allow consumers to interact with other products.

SUMMARY

In an embodiment, an interactive system includes a moveable assembly comprising a filtration device and a guiding member. A stationary assembly is mounted to a base comprising a pipe and an adapter mounted to the pipe. A track component is mounted to the base that guides the moveable assembly. The track component being sized and located to provide a closed track portion along which the moveable assembly can move toward the adapter to connect the filtration device to the adapter and away from the adapter toward an initial position.

In another embodiment, a method of interacting with a component of a product at a display location is provided. The method includes moving a moveable assembly comprising a filtration device along a track component toward a stationary assembly mounted to a base. The track component guides the moveable assembly toward the adapter. The filtration device is connected to the adapter.

In another embodiment, an interactive system includes a moveable assembly comprising a filtration device. A stationary assembly is mounted to a base comprising a faucet head and an adapter mounted to the faucet head. A mounting rod is mounted to the base and slidingly received by the filtration device such that the filtration device moves along a length of the mounting rod. The mounting rod has an end that is received by the adapter.

BRIEF DESCRIPTION OF THE DRAWINGS

The following detailed description of specific embodiments of the present invention can be best understood when read in conjunction with the drawings enclosed herewith.

Figure 1:
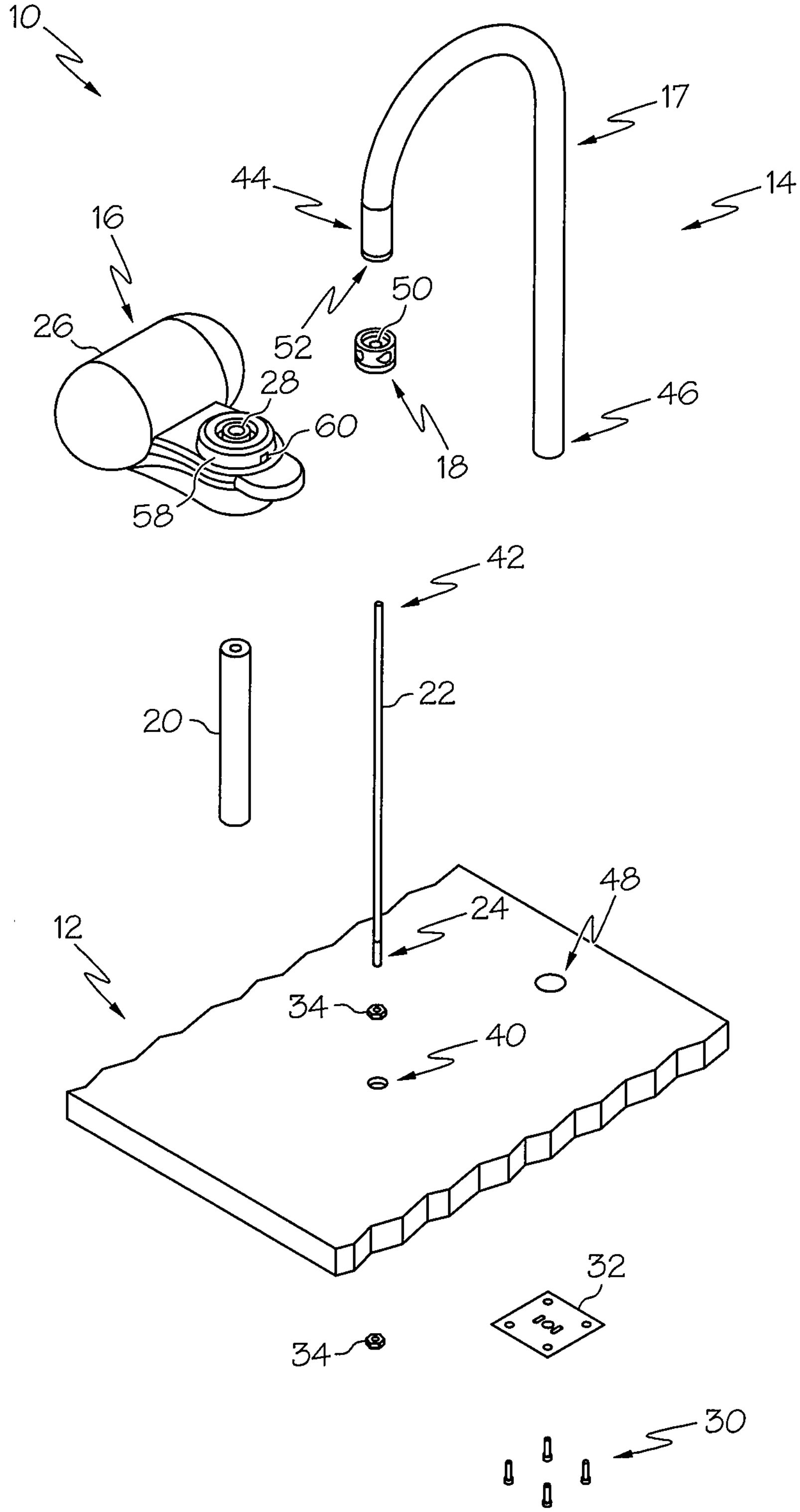
FIG. 1 is an exploded perspective view of an embodiment of an interactive system.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

Embodiments described herein generally pertain to interactive systems and methods that may be useful to consumers in making a purchase decision between products. The interactive systems and methods may allow consumer interaction with components of one or more products and can be used to communicate, for example, ease of use, features and operation of the one or more of the products within a retail store or other display location.

The interactive systems may be deployed in retail stores to help consumers choose between similar or even dissimilar products. For example, an interactive system may include a mechanical component that can be manipulated by the consumer. Such an interactive system may include both a stationary component and a moveable component. The stationary component may be capable of interlocking with the moveable component, for example, to highlight a quick-interconnect feature. The moveable component may be released from the stationary component (e.g., "quick disconnect" feature), for example, using the quick-interconnect feature and then reconnected repeatedly. The interactive systems may also be provided as a kit for assembly at the display location.

Referring to FIG. 1, an interactive system 10 is shown in an exploded configuration and generally includes a base 12 upon which a stationary assembly 14 and a moveable assembly 16 are mounted. The stationary assembly 14, in this embodiment, includes a first stationary component in the form of a gooseneck-shaped pipe 17 that provides a support structure for a second stationary component in the form of an adapter 18 that can be affixed to an end of the pipe 17 (e.g., through a threaded connection). In some embodiments, there may be only a single stationary component.

The moveable assembly 16 includes a first moveable component in the form of a guiding member 20 (e.g., a polycarbonate extrusion in the form of a hollow tube) having an inner diameter suitable for sidably receiving a track component 22 (e.g., a mounting rod) that can be fixedly mounted to the base 12 at its mounting end 24 in a substantially vertical orientation. A second moveable component in the form of a faucet mounted filtration device 26 is also part of the moveable assembly 16 and includes an opening 28 that is sized to slidably receive the track component 22. In some embodiments, there may be only a single moveable component.

Any suitable method and device may be used to mount the pipe 17 and the track component 22 to the base 12. In the illustrated embodiment, the pipe 17 may be mounted to the base 12 using one or more fasteners 30 and a mounting plate 32. The track component 22 may include a threaded mounting end 24 that mates with the threaded nuts 34. Any other suitable mounting arrangement may be used such as adhesives, friction fit structures, snap locking structures, etc. In some embodiments, the mounting arrangement used renders removal of the pipe 17 and the track component 22 from the base 12 difficult, for example, by hand (i.e., without the use of a tool).

As will be explained in greater detail below, the interactive system 10 may be made to resemble a faucet arrangement. Thus, the pipe 17 may resemble or be part of a faucet head. The track component 22 and the guiding member 20 may have a blue color exterior (e.g., powder coated blue). Any other suitable arrangement and/or color scheme may be used depending on the type of interactive system being used.

To assemble the interactive system 10, the track component 22 may be affixed to the base 12 using the threaded mounting end 24 and the threaded nuts 34. An opening 40 may be preformed in the base 12 and may be countersunk such that the nuts 34 sit within a recesses in the base 12 (e.g., below or flush with outer surfaces of the base 12). Once mounted to the base 12, the track component 22 stands in a vertical orientation, perpendicular with the base 12. However, other configurations are possible such at a tortuous-shaped track component 22 having various bends.

The guiding member 20 may then be slid over a free end 42 of the track component 22. The inner diameter of the guiding member 20 is sized such that the guiding member 20 may freely slide along a height of the track component 22 with little friction. The filtration device 26 may then be slid over the track component 22 such that it rests against the guiding member 20. In some embodiments, the guiding member 20 is formed of a somewhat soft, resilient material that provides a cushion against which the filtration device 26 can rest. In other embodiments, the guiding member 20 may be attached directly to the filtration device 26 via any suitable method (e.g., glue, threads, etc.)

The adapter 18 may be affixed to the end 44 of the pipe 17 using a threaded connection. A mounting end 46 of the pipe 17 may then be placed in a preformed opening 48 formed in the base 12, while openings 50 and 52 of the adapter 18 and pipe 17 receive the free end 42 of the track component 22. The pipe 17 may then be locked into place using the one or more fasteners 30 and the mounting plate 32 thereby forming a somewhat closed track portion, locking the moveable components 20 and 26 within the closed track portion.

Figure 2:
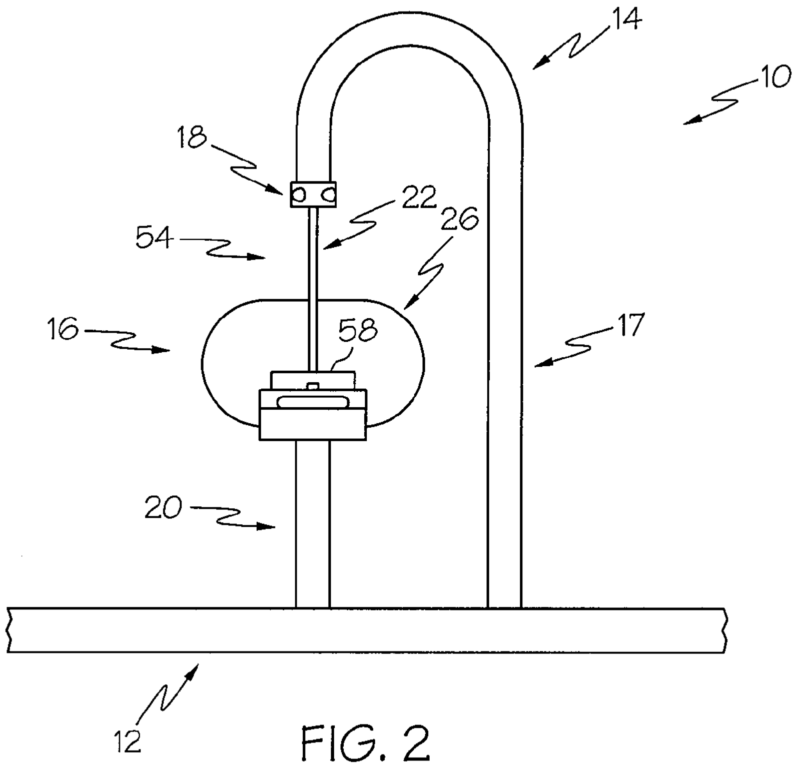
FIG. 2 is a side view of the interactive system of FIG. 1 in an assembled configuration.

Referring to FIG. 2, the interactive system 10 is illustrated in its assembled configuration with the moveable components 20 and 26 within the closed track portion 54. As can be seen, the guiding member 20 is shorter than the track component 22 providing spacing between the filtration device 26 and the adapter 18 to allow for vertical movement of the moveable assembly 16 up and down along the length of the track component 22, toward and away from the adapter 18.

Figure 3:
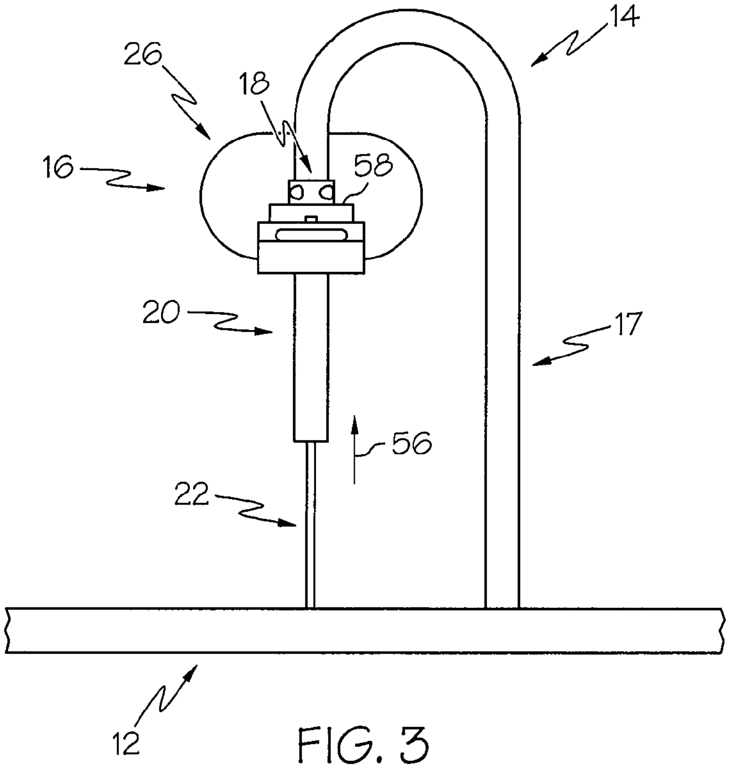
FIG. 3 is a side view of the interactive system of FIG. 1 with an embodiment of a moveable assembly being moved toward a stationary assembly.

FIG. 2 illustrates the moveable assembly 16 in an initial configuration with the guiding member 20 and the filtration device 26 resting on the base 12 and spaced from the adapter 18. Referring to FIG. 3, a customer or employee may lift the moveable assembly 16 by grasping the guiding member 20 and lifting the moveable assembly 16 in the direction of arrow 56 toward the adapter 18. The track component 22 provides a fixed track along which the moveable assembly 16 moves. The moveable assembly 16 may continue moving upward until the filtration device 26 interacts with the adapter 18 forming a lock and seal which may be confirmed by an audible click. More particularly, the filtration device 26 may include an inlet adapter 58 that sealingly mates with the faucet outlet adapter 18.

Figure 4:
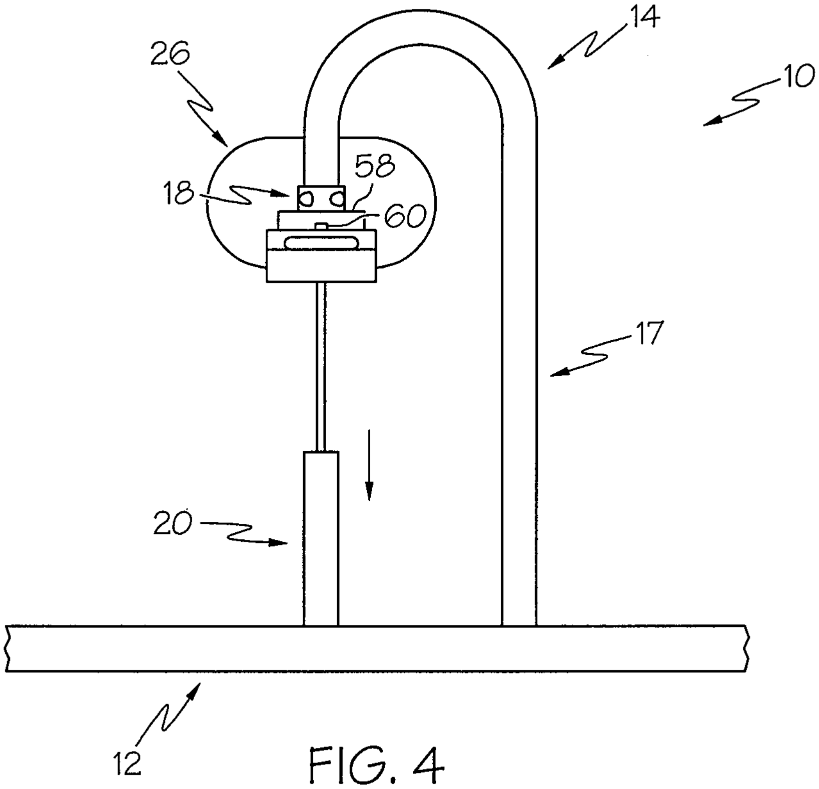
FIG. 4 is another side view of the interactive system of FIG. 1 in a latched configuration.

Referring to FIG. 4, the guiding member 20 may be lowered back to its initial position with the filtration device 26 interlocked with the adapter 18. Alternatively, the guiding member 20 may be attached to the filtration device 26 such that they move together. The adapters 18 and 58 may be unlocked using a quick-release mechanism 60 (see FIG. 1 also) on the filtration device 26. Once released, the filtration device 26 may be moved back to its original position as illustrated by FIG. 2.

Other configurations are possible. For example, the filtration device 26 may not receive the track component 22 within an opening. For example, the filtration device 26 may be connected to the guiding member 20 at a location adjacent the track component 20 such that the filtration device 26 moves along the track component 22 via the connection between the track component 22 and the guiding member 20.

The above-described interactive system allows a consumer to interact with the filtration device 26 at the point of sale to experience the unique features of the device and its simulated operation before making a purchasing decision. To experience the attachment of the filtration device 26 to a faucet, the guiding member 20 which is engaged with the filtration device 26 can be grasped and moved in an upward or downward direction along the track component 22. In the upward direction, the filtration device 26 can be moved until a point where the adapter 58 attached to the top of the filtration device 26 interacts with the complimentary adapter 18 attached to the faucet outlet to form a locking connection that is signaled by a clicking sound. The locking connection can be interrupted and the filtration device 26 moved downward along the track component 22 by depressing the release mechanism 60, e.g., found on both sides of the device. This sequence can be repeated as often as desired by the customer to gain comfort and familiarity with the filtration device 26 and its method of attachment to a faucet. If desired, the consumer can also interact with other movable features of the filtration device 26 such as a valve switch mechanism (shown as 60) located on the side of the device. The tactile qualities of the filtration device 26, finish and color options can also be communicated to the consumer via interaction with the filtration device 26.

While the filtration device 26 and adapter 58 are described above, connecting structure other than the adapter 58 may be used. For example, the pipe 17 may include only a threaded portion for connecting the filtration device 26 to the pipe 17. In these embodiments, the consumer may be able to connect the filtration device 26 to the pipe 17 using the threaded portion and a corresponding threaded portion carried by the filtration device 26.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An interactive system, comprising:

a moveable assembly comprising a filtration device;

a stationary assembly mounted to a base comprising a pipe and an adapter mounted to the pipe; and a track component mounted to the base that guides the moveable assembly, the track component being sized and located to provide a closed track portion along which the moveable assembly can move toward the adapter to connect the filtration device to the adapter and away from the adapter toward an initial position.

2. The interactive system of claim 1, wherein the track component is a mounting rod, the filtration device including an opening that slidingly receives the mounting rod.

3. The interactive system of claim 2, wherein a free end of the mounting rod is located in the adapter.

4. The interactive system of claim 1, wherein the pipe is in the form of a faucet head.

5. The interactive system of claim 1, wherein the adapter is a faucet outlet adapter, the filtration device including a filtration device inlet adapter configured to releasably mate with the faucet outlet adapter.

6. The interactive system of claim 5 further comprising a release mechanism that releases the filtration inlet adapter from the faucet outlet adapter.

7. The interactive system of claim 5 further comprising a guiding member guided by the track component that moves independently of the filtration device when the filtration device inlet adapter is connected to the faucet outlet adapter.

8. The interactive system of claim 5 further comprising a guiding member that is connected to the filtration device.

9. An interactive system, comprising:

a moveable assembly comprising a filtration device;

a stationary assembly mounted to a base comprising a faucet head and an adapter mounted to the faucet head; and a mounting rod mounted to the base and slidingly received by the filtration device such that the filtration device moves along a length of the mounting rod, the mounting rod having an end that is received by the adapter.

10. The interactive system of claim 9, wherein the adapter is a faucet outlet adapter, the filtration device including a filtration device inlet adapter configured to releasably mate with the faucet outlet adapter.

11. The interactive system of claim 10 further comprising a release mechanism that releases the filtration inlet adapter from the faucet outlet adapter.

12. The interactive system of claim 10 further comprising a guiding member guided by the mounting rod that moves independently of the filtration device when the filtration device inlet adapter is connected to the faucet outlet adapter.

13. The interactive system of claim 9, wherein the mounting rod is powder coated blue in color.

* * * * *